United States Patent [19]

Lutz

[11] 4,315,898

[45] Feb. 16, 1982

[54] PREPARATION OF GRANULAR SODIUM TRIPOLYPHOSPHATE HEXAHYDRATE WITH LOW FRIABILITY

[75] Inventor: Charles W. Lutz, Princeton, N.J.

[73] Assignee: FMC Corportion, Philadelphia, Pa.

[21] Appl. No.: 164,626

[22] Filed: Jun. 30, 1980

[51] Int. Cl.³ ............................................. C01B 25/30
[52] U.S. Cl. .................................................. 423/315
[58] Field of Search ........................................ 423/315

[56] References Cited

U.S. PATENT DOCUMENTS

| | | | |
|---|---|---|---|
| 2,745,717 | 5/1956 | Edwards | 423/315 |
| 2,898,189 | 8/1959 | Rodis et al. | 23/107 |
| 2,916,354 | 12/1959 | Edwards | 423/315 |
| 3,046,092 | 7/1962 | Montague | 23/106 |
| 3,054,656 | 9/1962 | Cassidy et al. | 23/106 |
| 3,356,447 | 12/1967 | Tafler | 23/106 |
| 3,384,452 | 5/1968 | Heymer et al. | 23/106 |
| 3,469,938 | 9/1969 | McLeod et al. | 23/107 |
| 3,506,586 | 4/1970 | Baskerville et al. | 423/315 |
| 3,520,817 | 7/1970 | Caldwell et al. | 252/109 |
| 3,650,685 | 3/1972 | Dyer et al. | 23/107 |
| 3,672,826 | 6/1972 | Hornig et al. | 23/106 |
| 3,758,671 | 9/1973 | Kandler et al. | 423/315 |
| 3,761,573 | 9/1973 | Hinz et al. | 423/315 |
| 3,770,644 | 11/1973 | Huttinger et al. | 252/135 |
| 3,852,212 | 12/1974 | Groening et al. | 252/135 |
| 4,134,963 | 1/1979 | Pals | 423/315 |

OTHER PUBLICATIONS

U.S. Patent Application Ser. No. 609, filed Jan. 2, 1979

Primary Examiner—O. R. Vertiz
Assistant Examiner—Wayne A. Langel
Attorney, Agent, or Firm—Richard E. Elden; Eugene G. Horsky

[57] ABSTRACT

Screen undersize anhydrous sodium tripolyphosphate particles, containing at least 2 weight percent of an alkali metal pyrophosphate, preferably sodium pyrophosphate, are moisturized with from about 145% to about 185% by weight of the theoretical amount of water to convert the anhydrous sodium tripolyphosphate into the hexahydrate form. The material is agitated during moisturization to keep the temperature below about 80° C., and the moisturized material is dried at a temperature below 80° C. to remove most of the free moisture. The product recovered from the drying step is a granular sodium tripolyphosphate hexahydrate product having a bulk density within the range of 0.59 g/cc to 0.64 g/cc and a friability of no higher than 30%.

15 Claims, No Drawings

PREPARATION OF GRANULAR SODIUM TRIPOLYPHOSPHATE HEXAHYDRATE WITH LOW FRIABILITY

The present invvention relates to a process for preparing granular sodium tripolyphosphate hexahydrate products having low friability and a bulk density within the range of from about 0.59 to about 0.64 g/cc, wherein there is employed as the feed, screen undersize anhydrous sodium tripolyphosphate, typically obtained from the various commercial processes for producing granular anhydrous sodium tripolyphosphate.

In the formulation of modern detergent compositions, granular sodium tripolyphosphate has come into widespread use as a phosphate "builder" which increases the cleaning ability of these detergent compositions. Anhydrous sodium tripolyphosphate is produced by initially reacting phosphoric acid and an alkaline compound such as sodium hydroxide or sodium carbonate together in an aqueous solution such that the molar ratio of sodium to phosphorus is on the order of about 1.67. This reaction results in the formation of an aqueous mixture containing monosodium orthophosphate and disodium orthophosphate in a mole ratio of about 1:2.

Anhydrous sodium tripolyphosphate can be prepared therefrom in either a rotary kiln or a spray dryer. In the case of a rotary kiln, the free water is removed from the orthophosphate mixture by passing it through a heating zone where it is progressively heated to higher temperatures. At a temperature of about 250° C. or higher, anhydrous sodium tripolyphosphate is formed.

In the case of a spray dryer, the aqueous mixture of orthophosphates is dried to a predominately orthophosphate material which can be subsequently calcined in, for example, a rotary kiln or fluid bed calciner to form anhydrous sodium tripolyphosphate. It is also possible to produce anhydrous sodium tripolyphosphate directly in a suitably designed spray dryer.

While the exact mole ratio of sodium to phosphorus employed in the aqueous orthophosphate solution may be varied, the ultimate reaction takes place in accordance with the following equation:

$$NaH_2PO_4 + 2Na_2HPO_4 \rightarrow Na_5P_3O_{10} + 2H_2O$$

Sodium tripolyphosphate is commonly used in the manufacture of laundering, detergent and bleaching compositions. In the manufacture of such compositions, it is often desired to use sodium tripolyphosphate in the hydrated form, rather than in the anhydrous form as it is produced in either the rotary kiln or the spray dryer. In addition, certain physical properties of the hydrated sodium tripolyphosphate are important in preparing such compositions. These properties include bulk density and friability.

Bulk density may be defined in terms of the weight of hydrated sodium tripolyphosphate which freely flows into a container of given volume. A graduate cylinder was used to measure the bulk density herein. Another method which is used for measuring bulk density is the Solvay Process Method 302A described in the Solvay Technical and Engineering Service Bulletin No. 9 (page 33), issued in 1944. The bulk density measured by the Solvay Method is approximately equal to the bulk density measured by the graduate cylinder method, in grams per cubic centimeter, plus 0.02 g/cc.

Friability relates to particle strength—the lower the percent friability, the stronger the sodium tripolyphosphate particles, anhydrous or hydrated. Generally, particles of low friability are desired to prevent their fracturing during mixing, handling and transporting the detergent formulations. Friability values below 30% are generally desired for commercial use. Customer specifications often require the rejection of sodium tripolyphosphate products, both anhydrous and the hexahydrate, which have friability values above 30%. Values below 20% are considered good, and values below 10% are excellent.

Various processes are known for the preparation of granular sodium tripolyphosphate hexahydrate. U.S. Pat. No. 3,469,938, issued Sept. 30, 1969 to McLeod et al, discloses the preparation of a granular sodium tripolyphosphate hexahydrate product having a bulk density within the range 0.65-0.90 g/cc. The process of McLeod et al basically involves hydrating an anhydrous sodium tripolyphosphate feed material with not in excess of 105% of the theoretical quantity of water necessary to produce the hexahydrate. The feed material of McLeod et al requires the presence of at least about 10% by weight of −100 mesh particles.

U.S. Pat. No. 3,852,212, issued Dec. 3, 1974 to Groening et al, discloses the preparation of a granular sodium tripolyphosphate hexahydrate product having a bulk density within the range 0.65-0.71 g/cc. The process of Groening et al basically involves hydrating an anhydrous sodium tripolyphosphate feed material with not in excess of 105% of the theoretical quantity of water necessary to produce the hexahydrate. The feed material of Groening et al requires the presence of at least about 10% by weight of −100 mesh particles and the addition of at least about 2 weight percent of an alkali metal pyrophosphate.

While the processes of McLeod et al and Groening et al are of significant value to the detergent industry, these processes are limited to the preparation of a sodium tripolyphosphate hexahydrate product having a bulk density no lower than 0.65 g/cc.

It has now been found that granular sodium tripolyphosphate hexahydrate having low friability and a bulk density within the range of from about 0.59 g/cc to about 0.64 g/cc can be prepared by a process which comprises moisturizing screen undersize anhydrous sodium tripolyphosphate particles with from about 145% to about 185% by weight of the theoretical quantity of water necessary to produce sodium tripolyphosphate hexahydrate, said screen undersize anhydrous sodium tripolyphosphate particles containing at least about 2 weight percent of an alkali metal pyrophosphate, agitating the material being moisturized so as to keep the temperature below about 80° C., drying the moisturized material at a temperature below about 80° C. to remove most of the free moisture, and recovering said granular sodium tripolyphosphate hexahydrate.

The material fed to the moisturizing step is a screen undersize, anhydrous sodium tripolyphosphate material obtained, for example, from the commercial production of granular anhydrous sodium tripolyphosphate by either a spray drying process or a rotary kiln process. Generally, screen undersize particles have a size distribution at least 25% by weight −100 mesh, 0 to 65% by weight −50 +100 mesh, 0 to 10% by weight +50 mesh, and no more than about 50% −270 mesh. Preferably, the feed to the moisturizing step has a size distribution of at least 50% by weight −100 mesh, 0 to 50% by weight +100 mesh, and no more than about 20% by weight −270 mesh. All particle size designations herein represent U.S. Standard Screen values.

In carrying out the process of this invention, the anhydrous sodium tripolyphosphate particles are moisturized with from about 145% to about 185% by weight of the theoretical quantity of water necessary to produce sodium tripolyphosphate hexahydrate. This range of added water is equivalent to from about 30% to about 35% water by weight based on the weight of the wet sodium tripolyphosphate, that is, the weight of the anhydrous sodium tripolyphosphate plus the added water. Preferably, the anhydrous sodium tripolyphosphate particles are moisturized with from about 145% to about 160% by weight of the theoretical quantity of water necessary to produce sodium tripolyphosphate hexahydrate. This preferred range of added water is equivalent to from about 30% to about 32% water by weight based on the weight of the wet sodium tripolyphosphate.

The temperature of the water added to the anhydrous sodium tripolyphosphate is not critical, but it is preferably below 80° C. and more preferably within the range of from 10° C. to 50° C. It is generally impractical and unnecessary to employ temperatures greater than 80° C. or temperatures below 5° C.

Prior to being moisturized, the anhydrous sodium tripolyphosphate is mixed with at least about 2 weight percent of an alkali metal pyrophosphate. The alkali metal pyrophosphates that may be used include sodium pyrophosphate, potassium pyrophosphate, sodium acid pyrophosphate and other such pyrophosphate salts. The preferred material is sodium pyrophosphate. The pyrophosphate is preferably sized on the order of −100 mesh for ease of mixing and distribution. The preferred amount of pyrophosphate added to the anhydrous sodium tripolyphosphate is on the order of about 2 to about 7 weight percent, and the more preferred amount is on the order of about 3 to about 5 weight percent, based on the weight of the anhydrous sodium tripolyphosphate feed. Larger amounts of the pyrophosphate are not deleterious to the product, provided the product meets the required assay for sodium tripolyphosphate.

The proper mixture of anhydrous sodium tripolyphosphate and alkali metal pyrophosphate is subjected to agitation as the water is added at a rate sufficient to maintain the temperature of the mixture below 80° C. The agitation effects a more uniform distribution of water on the feed and tends to agglomerate the feed, particularly any fines that are present. Preferably, the agitation is achieved by rotation of the feed material. Equipment in which the feed may be moisturized and which provide the preferred agitation include, for example, a rotary disc granulator and a rotating horizontal drum hydrator with lifting flights. (See also the equipment described in U.S. Pat. No. 3,154,486 and 3,624,902.) Spraying is the most preferred method of water addition and may be done by any of the conventional spraying means, which includes, for example, air atomized or pneumatic spray nozzles.

As a result of the moisturization step, the anhydrous sodium tripolyphosphate is converted to sodium tripolyphosphate hexahydrate. Most of the free water present in the material exiting the moisturization step is removed in a drying step by contact with warm air. It is only necessary in the drying step to keep the temperature of the material low enough so that the sodium tripolyphosphate hexahydrate is not dehydrated. This can be accomplished by keeping the temperature below about 80° C. and preferably between 50° C. and 70° C.

The drying step can be accomplished by showering the moisturized material through a stream of warm air in a rotary dryer using an air inlet temperature of from about 80° C. to about 165° C. Any other means of drying the product can be used providing the temperature is not raised above about 80° C.

Preferably, the moisturized material should be dried until less than about 1 weight percent of free moisture is present in this material. More preferably, the moisturized material should be dried until the total moisture content is from about 18 to about 22 weight percent.

The dried granular sodium tripolyphosphate hexahydrate products are generally recovered by screening the dried material to isolate the desired product fraction. For commercial purposes, the granular product fraction is encompassed by the fraction −20 +100 mesh. Other granular fractions which can be isolated include, for example, −16 +100, −16 +94, and −20 +80. Such fractions are provided by the present invention. Preferably, the recovery of the desired fraction of granular sodium tripolyphosphate hexahydrate includes milling, then rescreening of any product screen oversize material. Preferably, any product undersize is recycled to the sodium tripolyphosphate dryer where the waters of hydration in the sodium tripolyphosphate hexahydrate can be removed at the high temperatures and ultimately fed again to the process of the present invention.

Granular sodium tripolyphosphate hexahydrate products obtained from the above described process have a low friability, that is, no higher than a value of 30, and a bulk density within the range of from about 0.59 g/cc to about 0.64 g/cc. The above described process can be carried out in either a batch fashion or, preferably, in a continuous fashion.

FRIABILITY DETERMINATION PROCEDURE

Friability as described and reported herein is determined as follows:

Two approximately 50 gram samples (designated Sample 1 and Sample 2) from a homogenized portion of the product to be tested are weighed to the nearest 0.01 grams. Sample 1 is transferred to the top of a screen nest including 20, 30 and 100 mesh screens. The screen nest with sample is placed on a Ro-Tap sieve shaker (manufactured by the W. S. Tyler Company) and shaken for 10 minutes. The amount of material which passes through the 100 mesh screen is weighed. The percent by weight of Sample 1 which passed through the 100 mesh screen is then calculated.

Sample 2 is transferred to an essentially vertical, 1 inch diameter×24 inch glass tube. A nonporous, cupped device suitable for collecting dust (for example, a Soxhlet extraction thimble) is fitted over the top opening of the glass tube preferably by means of a rubber tube.

Dry air at 37 psig is blown upwardly through the glass tube at a rate of 0.25 SCFM. The sample is fluidized and is maintained in a fluidized state for a period of 10 minutes. Thereafter, the material in the tube and in the dust collector is transferred to the top screen of a Ro-Tap shaker and is treated in the same manner as Sample 1. The percent by weight of Sample 2 which passed through the 100 mesh screen is then determined.

From the above numbers the friability is calculated as follows:

Friability = (% by weight of Sample 2 passed through 100 mesh screen) minus (% by weight of Sample 1 passed through 100 mesh screen.)

EXPERIMENTAL EQUIPMENT AND PROCEDURE

For each experimental run, 500 grams of anhydrous sodium tripolyphosphate were placed in a rotary drum along with the desired amount of the alkali metal pyrophosphate. The rotary drum was a stainless steel cylinder 25 cm long and 20 cm in diameter having four 2 cm flights and a 2.5 cm retaining ring. To prevent moist material from adhering to the walls of the rotary, a jolting action was provided by raising a hammer on 4 ramps and allowing the hammer to fall on a steel band welded to the outside of the rotary.

A two-fluid atomizing nozzle, with nitrogen serving as the atomizing fluid, was used to spray the water onto the material in the rotary. The water was supplied to the nozzle at about 10 psig, while the nitrogen was supplied at about 17 psig.

While the drum was rotating at about 6 rpm, the water was sprayed onto the solids at the rate of about 50 ml/min. Spraying was stopped after each 50 ml portion of water was added and the bed of semi-moisturized sodium tripolyphosphate was thoroughly mixed with a large spatula. When the desired amount of water had been added, water addition was stopped and the product was dried in the rotary drum at temperatures of 50°–70° C. by blowing hot air from a heat gun into the rotary. The temperature of the product being dried was measured by a stainless steel thermometer stem placed in the tumbling bed of product. Drying was conducted for about one hour and generally provided a sodium tripolyphosphate hexahydrate product having a free moisture content of less than about 1 weight percent and a total moisture content of between 18 and 22 weight percent.

The dried sodium tripolyphosphate product was screened to recover the granular −20 +100 mesh fraction. This fraction was then tested to determine friability and bulk density.

The following examples were conducted using the above equipment and procedures:

EXAMPLE 1

Screen undersize anhydrous sodium tripolyphosphate containing 4 weight percent sodium pyrophosphate powder was sprayed with 156% by weight of the theoretical quantity of water necessary to convert the anhydrous sodium tripolyphosphate into the hexahydrate form. This water addition level is equivalent to about 31.4 weight percent based on the weight of the wet sodium tripolyphosphate.

After moisturizing and drying, the sodium tripolyphosphate hexahydrate, having mixed therein the sodium pyrophosphate, was removed from the rotary and was screened. About 50 weight percent of the material recovered from the rotary made up the granular fraction of −20 +100 mesh material. This fraction had a bulk density of 0.59 g/cc and a friability of 28%.

EXAMPLE 2

Screen undersize anhydrous sodium tripolyphosphate containing 4 weight percent sodium pyrophosphate powder was sprayed with 160% by weight of the theoretical quantity of water necessary to convert the anhydrous sodium tripolyphosphate into the hexahydrate form. This water addition level is equivalent to about 32 weight percent based on the weight of the wet sodium tripolyphosphate.

After moisturizing, drying and screening, the recovered sodium tripolyphosphate hexahydrate had a bulk density of 0.64 g/cc with a friability of 23% and a granular yield of about 47%.

COMPARATIVE EXAMPLE 3

This example demonstrates the unfavorable product resulting when using a water addition level below 145% of the theoretical amount for hexahydrate formation.

Screen undersize anhydrous sodium tripolyphosphate containing 4 weight percent sodium pyrophosphate powder was sprayed with 142% by weight of the theoretical quantity of water necessary to convert the anhydrous sodium tripolyphosphate into the hexahydrate form. This water addition level is equivalent to about 29.5 weight percent based on the weight of the wet sodium tripolyphosphate.

After moisturizing, drying and screening, the recovered sodium tripolyphosphate hexahydrate had a bulk density of 0.59 g/cc with an unacceptably high friability of 31% and a granular yield of about 58%.

COMPARATIVE EXAMPLE 4

This example demonstrates the unfavorable results achieved when the alkali metal pyrophosphate is omitted in the feed material.

Screen undersize anhydrous sodium tripolyphosphate containing no alkali metal pyrophosphate was sprayed with 157% by weight of the theoretical quantity of water necessary to convert the anhydrous sodium tripolyphosphate into the hexahydrate form. This water addition level is equivalent to about 31.6 weight percent based on the weight of the wet sodium tripolyphosphate.

After moisturizing, drying and screening, the recovered sodium tripolyphosphate hexahydrate had an unacceptably high bulk density of 0.68 g/cc with a friability of 25% and a granular yield of 41%. During the moisturization step, the material "balled" excessively. "Balling" refers to the development of a significant amount of particles with sizes greater than 15 mm in diameter. In a commercial operation, balling is unacceptable.

COMPARATIVE EXAMPLE 5 (RUNS A THROUGH G)

This example demonstrates the effect of anhydrous sodium tripolyphosphate feed sizing on bulk density and friability.

Six runs (Runs A, B, C, D, E and F) were conducted by spraying water onto anhydrous sodium tripolyphosphate powder having a particle size distribution of 95% by weight −100 mesh and 75% by weight −270 mesh. No alkali metal pyrophosphate was added to Runs A through F. The amount of water sprayed and the properties of the resulting sodium tripolyphosphate hexahydrate particles are as follows:

| Run | % H$_2$O Added, Hexahydrate Basis(1) | % H$_2$O Added, Wet Product Basis(2) | Bulk Density, g/cc | Friability, % |
|---|---|---|---|---|
| A | 121.5 | 26.3 | 0.48 | 47 |
| B | 173.8 | 33.8 | 0.55 | 36 |
| C | 196.5 | 36.6 | 0.60 | 34 |
| D | 206.0 | 37.7 | 0.63 | 33 |

-continued

| Run | % H₂O Added, Hexahydrate Basis(1) | % H₂O Added, Wet Product Basis(2) | Bulk Density, g/cc | Friability, % |
|---|---|---|---|---|
| E(3) | 214.9 | 38.7 | 0.63 | 28 |
| F(3) | 218.6 | 39.1 | 0.74 | 11 |

(1)Percent by weight of the theoretical quantity of water necessary to convert the anhydrous sodium tripolyphosphate into the hexahydrate form.
(2)Percent by weight of water based on the wet sodium tripolyphosphate.
(3)Excessive balling occurred in these runs.

As the amount of water added increases, the bulk density increases and the percent of friability decreases.

In a seventh run, Run G, 198.2% by weight of the theoretical quantity of water necessary to convert the anhydrous sodium tripolyphosphates into the hexahydrate form was sprayed onto 500 g of anhydrous sodium tripolyphosphate containing 4 weight percent sodium pyrophosphate. This amount of water, outside the scope of the present invention, was necessary just to get the bulk density of the product sodium tripolyphosphate hexahydrate up to 0.59 g/cc. The product formed, however, had an unacceptably high friability of 33%.

I claim:

1. A process for the production of granular sodium tripolyphosphate hexahydrate having low friability and a bulk density within the range of from about 0.59 g/cc to about 0.64 g/cc, which comprises moisturizing screen undersize anhydrous sodium tripolyphosphate particles with from about 145% to about 185% by weight of the theoretical quantity of water necessary to produce sodium tripolyphosphate hexahydrate, said screen undersize anhydrous sodium tripolyphosphate particles containing at least about 2 weight percent of an alkali metal pyrophosphate, said screen undersize particles having a size distribution of at least 25% by weight −100 mesh, 0 to 65% by weight −50 +100 mesh, 0 to 10% by weight +50 mesh and not more than about 50% by weight −270 mesh, agitating the material being moisturized so as to keep the temperature below about 80° C., drying the moisturized material at a temperature below about 80° C. to remove most of the free moisture, and recovering granular sodium tripolyphosphate hexahydrate.

2. A continuous process for the production of granular sodium tripolyphosphate hexahydrate having low friability and a bulk density within the range of from about 0.59 g/cc to about 0.64 g/cc, which comprises continuously moisturizing screen undersize anhydrous sodium tripolyphosphate particles with from about 145% to about 185% by weight of the theoretical quantity of water necessary to produce sodium tripolyphosphate hexahydrate, said screen undersize anhydrous sodium tripolyphosphate particles containing at least about 2 weight percent of an alkali metal pyrophosphate, said screen undersize particles having a size distribution of at least 25% by weight −100 mesh, 0 to 65% by weight −50 +100 mesh, 0 to 10% by weight +50 mesh and not more than about 50% by weight −270 mesh, continuously agitating the material being moisturized so as to keep the temperature below about 80° C., continuously drying the moisturized material at a temperature below about 80° C. to remove most of the free moisture, and continuously recovering granular sodium tripolyphosphate hexahydrate.

3. The process of claims 1 or 2 wherein the screen undersize anhydrous sodium tripolyphosphate particles are spray dried particles.

4. The process of claims 1 or 2 wherein the screen undersize anhydrous sodium tripolyphosphate particles are rotary dried particles.

5. The process of claims 1 or 2 wherein the screen undersize anhydrous sodium tripolyphosphate particles have a size distribution of at least 50% by weight −100 mesh, 0 to 50% by weight +100 mesh, and no more than 20% by weight −270 mesh.

6. The process of claims 1 or 2 wherein the screen undersize anhydrous sodium tripolyphosphate particles contain from about 2 to about 7 weight percent of an alkali metal pyrophosphate and said alkali metal pyrophosphate is sodium pyrophosphate.

7. The process of claims 1 or 2 wherein the screen undersize anhydrous sodium tripolyphosphate particles contain from about 3 to about 5 weight percent of an alkali metal pyrophosphate and said alkali metal pyrophosphate is sodium pyrophosphate.

8. The process of claims 1 or 2 wherein the material being moisturized is agitated by rotation.

9. The process of claims 1 or 2 wherein the water is added onto the agitated material by spraying.

10. The process of claims 1 or 2 wherein the material being moisturized is agitated so as to keep the temperature at from about 50° C. to about 70° C.

11. The process of claims 1 or 2 wherein the moisturized material is dried at a temperature of from about 50° C. to about 70° C.

12. The process of claims 1 or 2 wherein the moisturized material is dried in a rotary dryer.

13. The process of claims 1 or 2 wherein the moisturized material is dried until less than about 1 weight percent of free moisture is present.

14. The process of claims 1 or 2 wherein the moisturized material is dried until the total moisture content is from about 18 to about 22 weight percent.

15. The process of claims 1 or 2 wherein the granular sodium tripolyphosphate hexahydrate recovered is encompassed by the fraction −20 +100 mesh.

* * * * *